(12) United States Patent
Park

(10) Patent No.: US 8,027,133 B2
(45) Date of Patent: Sep. 27, 2011

(54) POWER PLATE FOR DRIVING AT LEAST ONE ROBOT

(75) Inventor: Chang Hyun Park, Seoul (KR)

(73) Assignee: IR Robot Co. Ltd., Bucheon-si, Gyeonggi-do (KR)

( * ) Notice: Subject to any disclaimer, the term of this patent is extended or adjusted under 35 U.S.C. 154(b) by 282 days.

(21) Appl. No.: 12/457,696

(22) Filed: Jun. 18, 2009

(65) Prior Publication Data
US 2009/0316317 A1    Dec. 24, 2009

(30) Foreign Application Priority Data
Jun. 19, 2008    (KR) .................. 10-2008-0057867

(51) Int. Cl.
*H02H 3/08*    (2006.01)

(52) U.S. Cl. ....................... 361/93.1; 361/62

(58) Field of Classification Search .................. None
See application file for complete search history.

(56) References Cited

U.S. PATENT DOCUMENTS 6,141,195 A * 10/2000 Buhring et al. ................. 361/67
2002/0030507 A1 * 3/2002 Farnworth et al. ............ 324/765

* cited by examiner

*Primary Examiner* — Jared Fureman
*Assistant Examiner* — Terrence Willoughby
(74) *Attorney, Agent, or Firm* — The Nath Law Group; Derek Richmond; Sungyeop Chung

(57) ABSTRACT

A power plate for driving a robot is provided herein. The power plate is capable of driving the robot in a stable manner. This stable drive of the robot is achieved by preventing a whole system paralysis phenomenon, which is caused by a local short-circuit occurring in a certain part of the power plate. The whole system paralysis is prevented by selectively breaking power supplied to a power supply pattern in association with the part where the short-circuit occurs.

8 Claims, 5 Drawing Sheets

POWER PLATE FOR DRIVING AT LEAST ONE ROBOT

CROSS-REFERENCE TO RELATED PATENT APPLICATIONS

This application claims the priority of Korean Patent Application No. 10-2008-0057867, filed on Jun. 19, 2008, in the Korean Intellectual Property Office, the disclosure of which is incorporated herein in its entirety by reference.

BACKGROUND OF THE INVENTION

1. Field of the Invention

The present invention relates to a power plate for driving a robot, and more particularly, to a method of driving a robot.

2. Description of the Related Art

When driving a battle robot by using a battery, there occurs a problem of frequently exchanging or charging the battery. To solve the problem, there is provided technology of driving a robot by using a power plate.

FIG. 1 is a configuration diagram illustrating a general power plate 100. Referring to FIG. 1, the power plate 100 includes an insulator 110, an upper electrode 120 and a lower electrode 130, formed on a top and a bottom of the insulator 110, respectively. The upper electrode 120 and the lower electrode 130 respectively include first conductors 121 and 131 for supplying (+) power and respectively include second conductors 122 and 132 electrically insulated from the first conductors 121 and 131 for supplying (−) power.

The first conductor 121 of the upper electrode 120 is electrically connected to the first conductor 131 of the lower electrode 130. The second conductor 122 of the upper electrode 120 is electrically connected to the second conductor 132 of the lower electrode 130. When two electrodes of a robot (not shown) are in contact with the first conductor 121 and the second conductor 122 formed on the upper electrode 120, power inputted via the lower electrode 130 is supplied to the robot, thereby driving the robot.

Generally, to drive a robot, a plurality of the power plates 100 are connected to one another. When the robot tumbles over and there occurs a short circuit on a certain power plate 100 since a part of a metal body of the robot is in contact with the first conductor 121 and the second conductor 122 formed on the upper electrode 120 or an electrode of an irregular robot of one's own manufacturing is in contact with the first conductor 121 and the second conductor 122 formed on the upper electrode 120, the short circuit has an effect on the all power plates 100 to paralyze the whole system, thereby also paralyzing other robots driven by the power plates 100 where there is no short circuit.

Accordingly, the present inventor has researched technology of preventing the paralysis of all power plates, which occurs from a short circuit locally occurring in a certain part of the whole plates.

SUMMARY OF THE INVENTION

The present invention provides a power plate for driving a robot, the power plate capable of preventing the paralysis of the whole system, caused by a local short circuit occurring in a certain part of the power plate.

According to an aspect of the present invention, there is provided a power plate for driving a robot, the power plate capable of preventing the paralysis of the whole system, caused by a local short circuit occurring in a certain part of the power plate, by detecting whether a power supply pattern formed on a power plate unit and electrically insulated from those of other power plate units is short-circuited and breaking power supplied to the short-circuited power supply pattern of the power plate unit.

According to another aspect of the present invention, there is provided a power plate for driving a robot, the power plate capable of preventing the paralysis of the whole system, caused by a local short circuit occurring in a certain part of the power plate, by detecting whether one of a plurality of power supply patterns formed on one power plate and electrically insulated is short-circuited and breaking power supplied to the one of the plurality of power supply patterns, which is short-circuited.

The present invention provides an effect of more stably driving a robot by preventing the paralysis of the whole system, caused by a local short circuit occurring in a certain part of a power plate for driving the robot by locally breaking power supplied to a power supply pattern of the part where the short circuit occurs.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining preferred embodiments of the invention with reference to the attached drawings to be easily known and reproduced by those skilled in the art.

Figure 1:
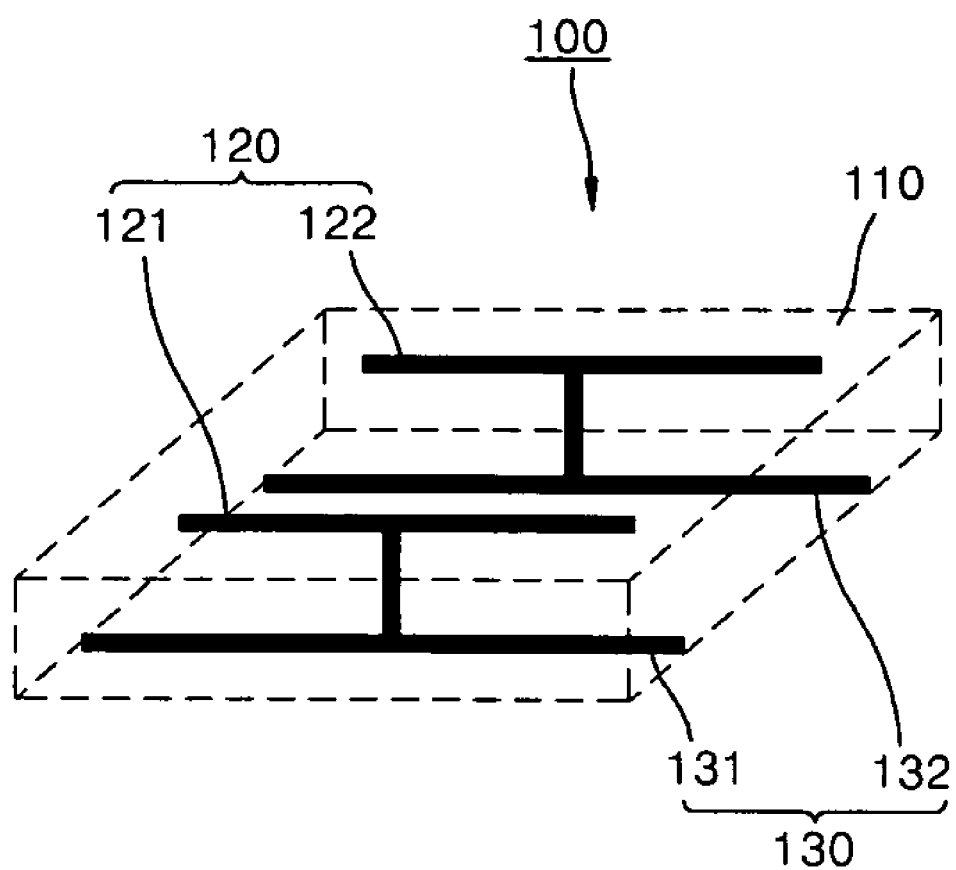
FIG. 1 is a configuration diagram illustrating a general power plate.
Figure 2:
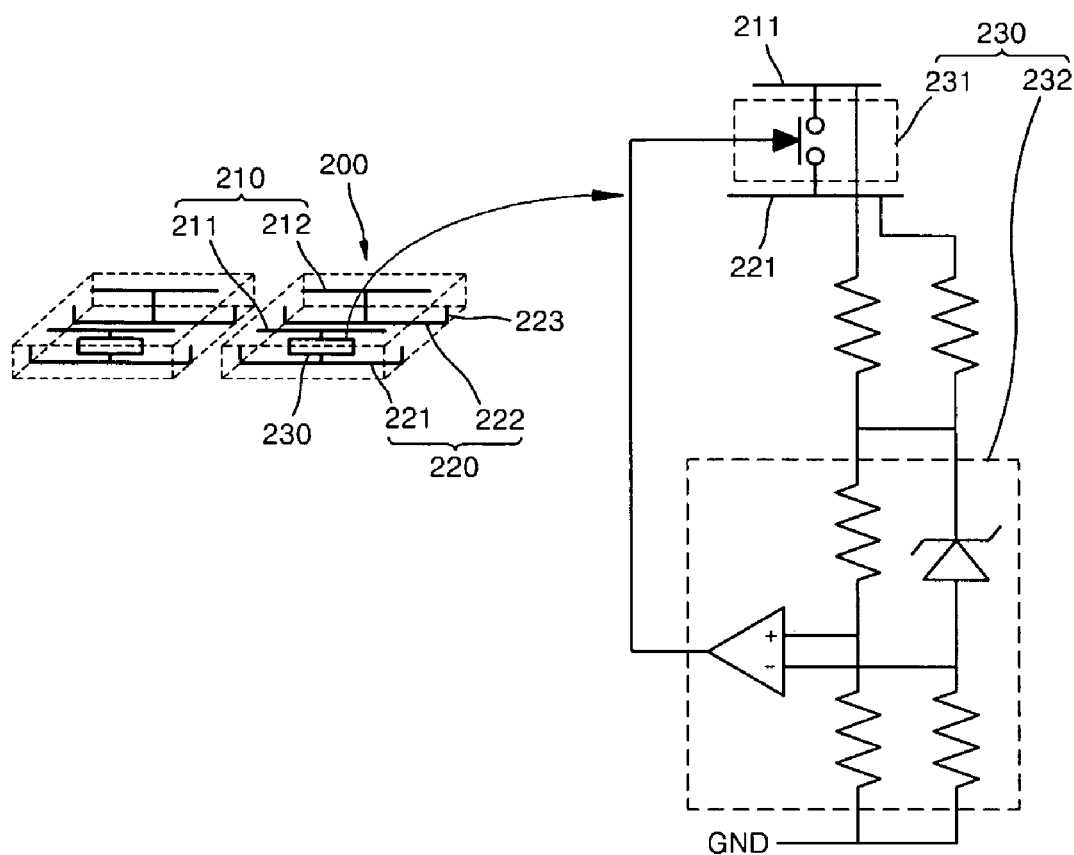
FIG. 2 is a configuration diagram illustrating a power plate for driving a robot, according to an embodiment of the present invention.

FIG. 2 is a configuration diagram illustrating a power plate for driving a robot, according to an embodiment of the present invention. Referring to FIG. 2, the power plate is formed of a plurality of power plate units 200, each of which includes an upper electrode 210, a lower electrode 220, and a power controller 230. An electrical nonconductor is formed between the upper electrode 210 and the lower electrode 220 via an insulator (not shown).

The upper electrode 210 includes power supply patterns 211 and 212 for driving the robot. The power supply pattern 211 of one side supplies (+) power while the power supply pattern 212 of another side supplies (−) power, wherein the former and the latter are electrically insulated from each other.

In this case, the power supply patterns 211 and 212 of the upper electrode 210 of the respective power plate units 200 may be electrically insulated from those of an adjacent power plate unit.

For example, as shown in FIG. 2, the power supply patterns 211 and 212 of the upper electrode 210 of the respective power plate units 200 may be separated from those of the adjacent power plate unit not to be electrically connected thereto.

The lower electrode 220 includes power supply lines 221 and 222. The power supply line 221 of one side supplies (+) power while the power supply line 222 of another side supplies (−) power, wherein the former and the latter are electrically insulated from each other.

In this case, the lower electrode 220 of the respective power plate units 200 may further include a connector 223 to electrically connect the power supply lines 221 and 222 of the lower electrode 220 of the power plate unit 200 to those of an adjacent power plate unit.

For example, as shown in FIG. 2, each of the power supply lines 221 and 222 of the lower electrode 220 of the power plate unit 200 may be extended to form the connector 223 on a side of the power plate unit 200 in such a way that each of the power supply lines 221 and 222 of the lower electrode 220 of the power plate unit 200 can be electrically connected to those of the adjacent power plate unit via the connector 223.

The power controller 230 includes a switch 231 and a short-circuit detector 232. The switch 231 supplies or breaks power to the power supply pattern 211 of the upper electrode 210.

For example, the switch 231 may be formed by electrically connecting the power supply pattern 211 of the upper electrode 210 of the power plate unit 200 to the power supply line 221 of the lower electrode 220 of the power plate unit 200 and employing a switching device such as a transistor between the power supply pattern 211 and the power supply line 221, which are electrically connected to each other.

Then, when power is inputted to the power supply line 221 of the lower electrode 220 of the power plate unit 200 electrically connected, the power is supplied or broken to the power supply pattern 211 of the upper electrode 210 according to turning on/off operation of the switch 231 formed between the power supply pattern 211 and the power supply line 221, which are electrically connected to each other.

That is, since the power supply lines 221 of the lower electrodes 220 of the respective power plate units 200 are electrically connected to one another, the power is supplied to the whole lower electrode 220. However, since the power supply patterns 211 of the upper electrodes 210 of the respective power plate units 200 are electrically insulated from one another and the power supplied from the power supply line 221 of the lower electrode 220 may be turned on/off via the switch 231, it is possible to control the power for each power plate unit 200 without an effect on the whole power plate.

For example, when a robot tumbles over while driven and a part of a metal body thereof is in contact with the power supply pattern 211 of one side of the upper electrode 210 and the power supply pattern 212 of another side thereof or when an electrode of an irregular robot of one's own manufacturing is in contact with the power supply pattern 211 of the one side of the upper electrode 210 and the power supply pattern 212 of another side thereof in such a way that a short circuit occurs in one of the power plate units 200, the power plate unit 200 where the short circuit occurs is electrically insulated from other power plate units 200 without an effect on the whole power plate by breaking the power to the corresponding power plate unit 200 by turning off the switch 231 formed between the power supply pattern 211 and the power supply line 221 of the corresponding power plate unit 200, which are electrically connected.

The short-circuit detector 232 detects whether the power supply pattern 211 of the upper electrode 210 is short-circuited and outputs a control signal to the switch 231 according to a result thereof.

Figure 4:
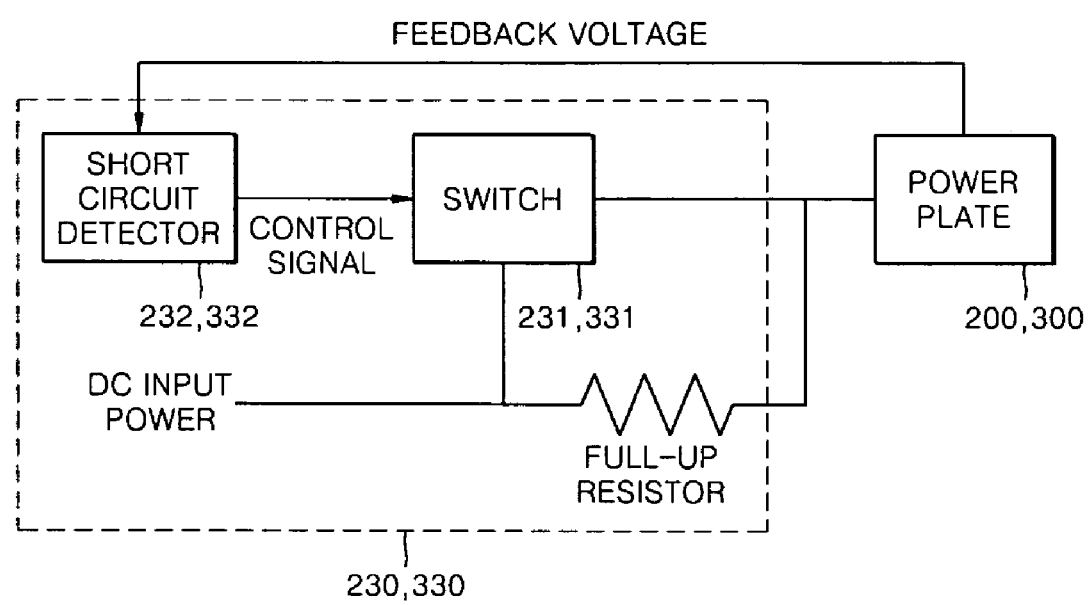
FIG. 4 is a schematic diagram illustrating a switch and a short-circuit detector of the power plate according to the embodiments of the present invention.

FIG. 4 is a schematic diagram illustrating switch 231 or 331 and short-circuit detectors 232 or 332 of power plates according to embodiments of the present invention. As shown in FIG. 4, the short-circuit detector 232 may be embodied as to output a control signal to break power supply to the power supply pattern 211 of the upper electrode 210 when a feedback voltage from the power supply pattern 211 is a reference voltage or less. Also, the short-circuit detector 232 may electrically insulate the power plate unit 200 where a short circuit occurs from other power plate units without an effect on the whole power plate by outputting the control signal to the switch 231.

In this case, when the feedback voltage from the power supply pattern 211 is greater than the reference voltage, the short-circuit detector 232 may output a control signal to supply the power to the power supply pattern 211 and output the control signal to the switch 231, thereby normally using the power plate unit 200 where a short circuit is solved and a state thereof returns to normal.

In FIG. 4, a full-up resistor turns 6n the switch 231 to supply the power to the power plate unit 200 when initially supplying the power and raises a voltage of the power plate unit 200 greater than the reference voltage to turn on the switch 231 to supply the power to the power plate unit 200 when getting rid of a cause of the short circuit.

Figure 5:
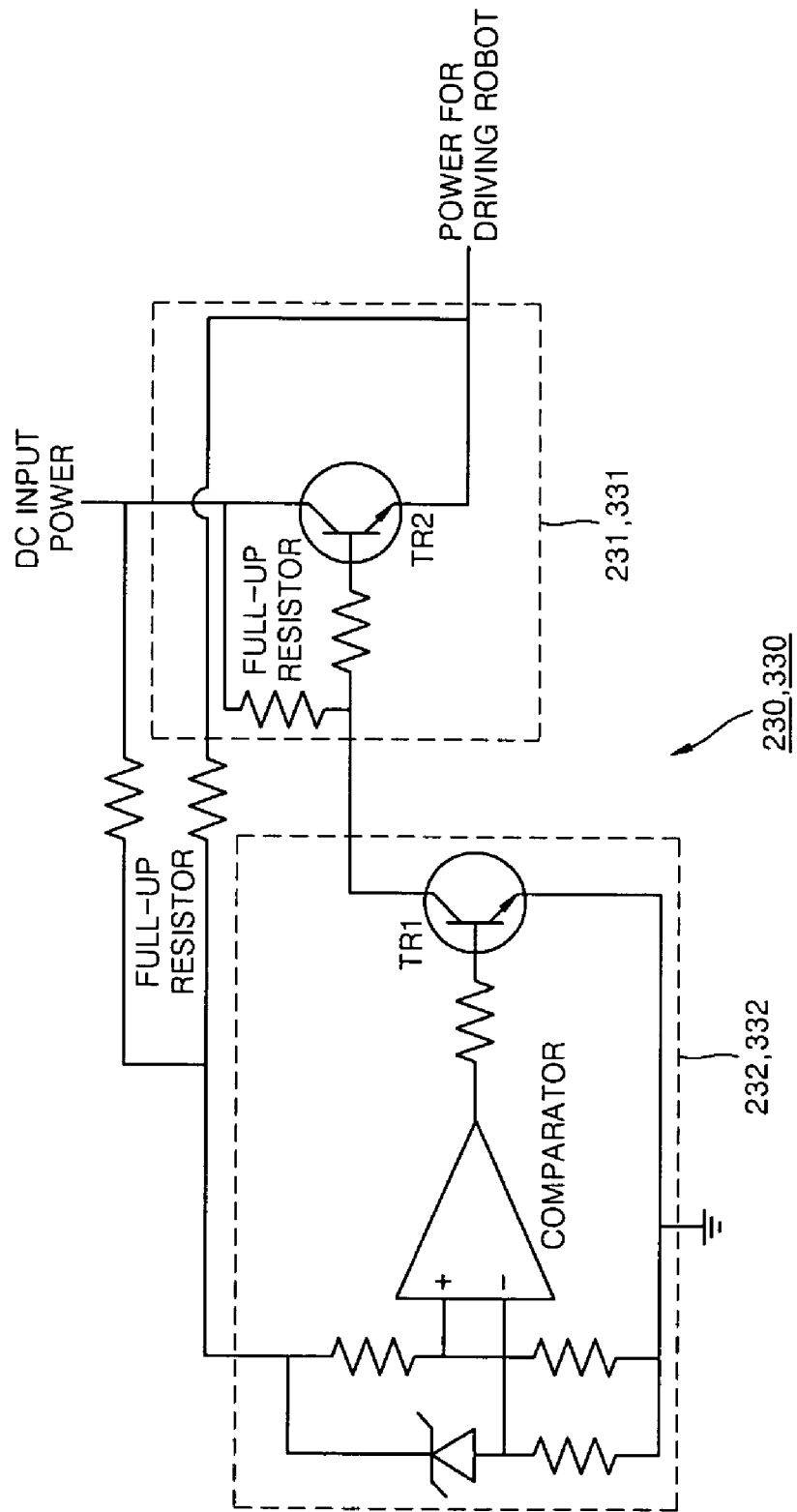
FIG. 5 is a circuit diagram illustrating the switch and the short-circuit detector of the power plate according to the embodiments of the present invention.

FIG. 5 is a circuit diagram illustrating the switch 231 or 331 and the short-circuit detector 232 or 332. As shown in FIG. 5, the short-circuit detector 232 includes a comparator comparing a feedback voltage from the power plate unit 200 with a reference voltage and a transistor TR1, whose base is connected to an output terminal of the comparator, turned on/off according to an output value of the comparator.

On the other hand, the switch 231 includes a transistor TR2 whose base is connected to a collector of the transistor TR1 of the short-circuit detector 232. When the feedback voltage is smaller than the reference voltage as a result of the comparison of the comparator of the short-circuit detector 232, that is, when a short circuit occurs, a voltage applied to the base of the transistor TR1 is a threshold or less and the transistor TR1 of the short-circuit detector 232 is turned off. Accordingly, a voltage applied to the base of the transistor TR2 of the switch 231 becomes the reference voltage or less in such a way that the transistor TR2 is also turned off, thereby breaking power supplied to the power plate unit 200.

On the other hand, when the feedback voltage is greater than as a result of the comparison of the comparator of the short-circuit detector 232, that is, when it is normal, a voltage applied to the base of the transistor TR1 is greater than the threshold and the transistor TR1 of the short-circuit detector 232 is turned on. Accordingly, a voltage applied to the transistor TR2 of the switch 231 becomes greater than the reference voltage in such a way that the transistor TR2 is also turned on, thereby supplying power to the power plate unit 200.

Therefore, as described above, it is possible to prevent the paralysis of the whole system, caused by a local short circuit, by locally breaking power supplied to a power supply pattern of a power plate unit where the short circuit occurs. Accordingly, it is possible to more stably drive a robot.

Figure 3:
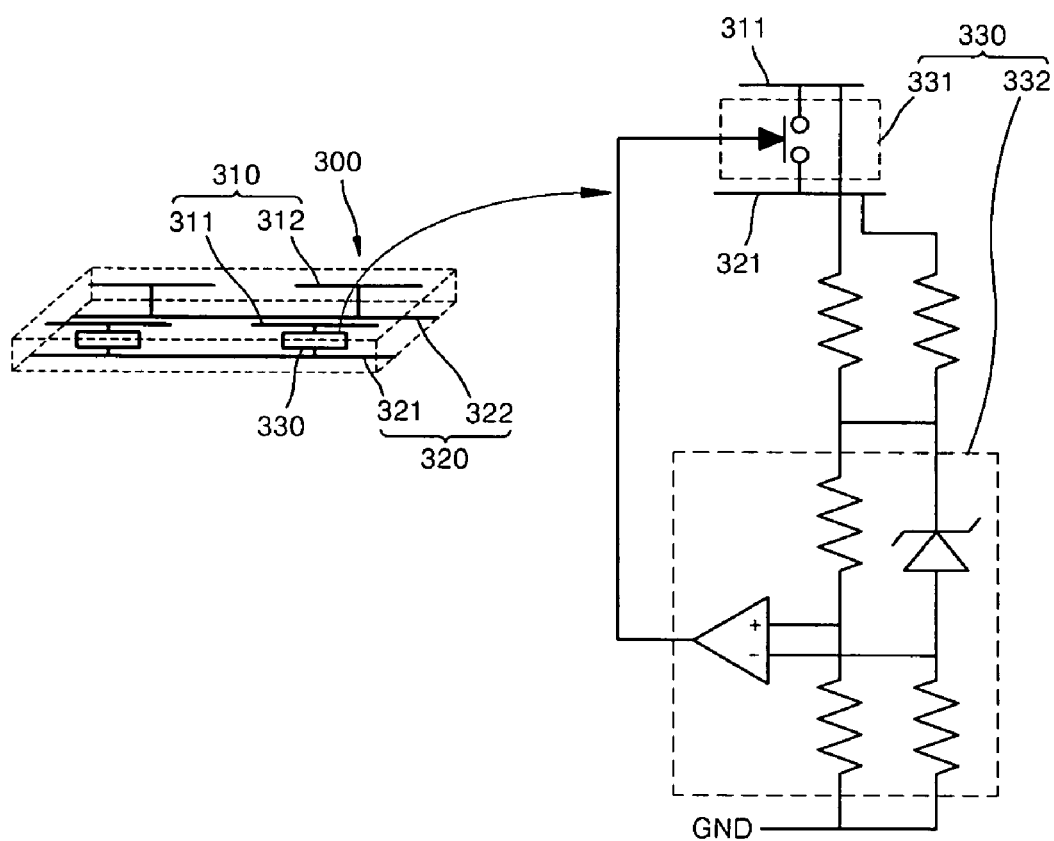
FIG. 3 is a configuration diagram illustrating a power plate for driving a robot, according to another embodiment of the present invention.

FIG. 3 is a configuration diagram illustrating a power plate 300 for driving a robot, according to another embodiment of the present invention. Different from the power plate shown in FIG. 2, instead of employing a plurality of power plate units, the power plate 300 includes a plurality of power supply patterns electrically insulated from one another in such a way that it is possible to locally break power supplied thereto. As shown in FIG. 3, the power plate 300 includes an upper electrode 310, a lower electrode 320, and a power controller 330. An electrical insulator is formed between the upper electrode 310 and the lower electrode 320 by using a nonconductor (not shown).

The upper electrode 310 includes a plurality of power supply patterns 311 and 312 electrically insulated from each other. The power supply pattern 311 of one side provides (+) power and the power supply pattern 312 supplies (−) power, which are electrically insulated from each other.

For example, as shown in FIG. 3, each of the power supply patterns 311 and 312 of the upper electrode 310 of the power plate 300 may be separated from adjacent power supply pattern not to be electrically connected to each other.

The lower electrode 320 includes power supply lines 321 and 322. The power supply line 321 of one side supplies (+) power and the power supply line 322 of another side supplies (−) power, which are electrically insulated from each other. For example, as shown in FIG. 3, each of the power supply lines 321 and 322 of the lower electrode 320 of the power plate 300 may be embodied as a power line or a power pattern.

The power controller 330 includes a switch 331 and a short-circuit detector 332. The switch 331 allows power to be supplied or broken to each power supply pattern 311 of the upper electrode 310.

For example, the switch 331 may be formed by electrically connecting each power supply pattern 311 of the upper electrode 310 to the power supply line 321 of the lower electrode 320 and employing a switching device such as a transistor between the power supply pattern 311 and the power supply line 321 electrically connected to each other.

Then, when inputting power to the power supply line 321 of the lower electrode 320 of the power plate 300, the power is supplied or broken to the power supply pattern 311 of the upper electrode 310 according to turning on/off operation of the switch 331 formed between the power supply pattern 311 of the upper electrode 310 and the power supply line 321, which are electrically connected to each other.

That is, when the power is supplied to the power supply line 321 of the lower electrode 320, since each power supply pattern 311 of the upper electrode 310 of the power plate 300 is electrically insulated from one another and it is possible to turn on/off the power supplied to the power supply line 321 of the lower electrode 320 via the switch 331, it is possible to control the power for each power supply pattern 311 of the upper electrode 310 without an effect on the whole power plate 300.

For example, when a robot tumbles over while driven and a short circuit occurs in a certain part of the power plate 300 due to a contact between the power supply pattern 311 of one side on a certain part of the upper electrode 310 and the power supply pattern 312 of another side or when a short circuit occurs in a certain part of the power plate 300 due to a contact between an electrode of an irregular robot of one's own manufacturing and the power supply pattern 311 and the power supply pattern 312 of a certain part of the upper electrode 310, only the certain part of the power plate 300, where the short circuit occurs, is electrically insulated without an effect on the whole power plate 300 by breaking power supply to the corresponding part by turning off the switch 331 formed between the corresponding power supply pattern 311 and the power supply line 321.

The short-circuit detector 332 detects whether each power supply pattern 311 of the upper electrode 310 is short-circuited and outputs a control signal to each switch 331 according to a result thereof.

In this case, as shown in FIG. 4, the short-circuit detector 332 may outputs a control signal to break the power supply to the power supply pattern 311 of the upper electrode 310 when a feedback voltage from the power supply pattern 311 of the upper electrode 310 is a reference voltage or less as a result of comparison. A part where a short circuit occurs may be electrically insulated without an effect on the whole power plate 300 by outputting the control signal to the switch 331.

In this case, the short-circuit detector 332 may output a control signal to supply the power to the power supply pattern 311 of the upper electrode 310 when the feedback voltage from the power supply pattern 311 of the upper electrode 310 is greater than the reference voltage as a result of comparison. The control signal may be outputted to the switch 331 to solve the short circuit in such a way that power supply pattern 311 returning to normal may be normally used. Since configurations of the switch 331 and the short-circuit detector 332 are identical to that shown in FIGS. 4 and 5, a detailed description thereof will be omitted.

Accordingly, it is possible to prevent the paralysis of the whole system, caused by a local short circuit occurring in a certain part of a power plate for driving by locally breaking power supplied to a power supply pattern of the power plate, where the short circuit occurs, thereby more stably driving a robot.

The present invention will be used in the fields of robot driving technology and applied technology thereof.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A power plate for driving a robot, the power plate formed of a plurality of power plate units, each of which comprising:
    an upper electrode comprising a power supply pattern for driving a robot;
    a lower electrode comprising a power supply line; and
    a power controller comprising a switch for supplying or breaking power to the power supply pattern of the upper electrode and a short-circuit detector detecting whether the power supply pattern of the upper electrode is short-circuited and outputting a control signal to the switch according to a result of the detecting.

2. The power plate of claim 1, wherein the power supply pattern of the upper electrode of each of the power plate units is electrically insulated from a power supply pattern of an upper electrode of an adjacent power plate unit.

3. The power plate of claim 1, wherein the lower electrode of each of the power plate units further comprises a connector electrically connecting the power supply line of the lower electrode of each of the power plate units to a power supply line of a lower electrode of an adjacent power plate unit.

4. The power plate according to anyone of claim 1, wherein the short-circuit detector outputs a control signal for breaking the power to the power supply pattern of the upper electrode when a feedback voltage from the power supply pattern of the upper electrode equals to or smaller than a reference voltage as a result of a comparison between the feedback voltage and the reference voltage.

5. The power plate according to anyone of claim 1, wherein the short-circuit detector outputs a control signal for supplying the power to the power supply pattern of the upper electrode when a feedback voltage from the power supply pattern of the upper electrode is greater than a reference voltage as a result of a comparison between the feedback voltage and the reference voltage.

6. A power plate for driving a robot, the power plate comprising:
- an upper electrode comprising a plurality of power supply patterns for driving a robot, the power supply patterns electrically insulated from one another;
- a lower electrode comprising a power supply line; and
- a power controller comprising a switch for supplying or breaking power to the power supply pattern of the upper electrode and a short-circuit detector detecting whether the power supply pattern of the upper electrode is short-circuited and outputting a control signal to the switch according to a result of the detection.

7. The power plate of claim 6, wherein the short-circuit detector outputs a control signal for breaking the power to the power supply pattern of the upper electrode when a feedback voltage from the power supply pattern of the upper electrode equals to or smaller than a reference voltage as a result of a comparison between the feedback voltage and the reference voltage.

8. The power plate of claim 6, wherein the short-circuit detector outputs a control signal for supplying the power to the power supply pattern of the upper electrode when a feedback voltage from the power supply pattern of the upper electrode is greater than a reference voltage as a result of a comparison between the feedback voltage and the reference voltage.

* * * * *